United States Patent [19]

Fay et al.

[11] Patent Number: 5,368,184
[45] Date of Patent: Nov. 29, 1994

[54] INSULATION FOR VESSELS CARRYING CRYOGENIC LIQUIDS

[75] Inventors: Ralph M. Fay, Lakewood; Mark A. Albers, Littleton, both of Colo.

[73] Assignee: Schuller International, Inc., Denver, Colo.

[21] Appl. No.: 990,999

[22] Filed: Dec. 16, 1992

[51] Int. Cl.$^5$ .............................................. B65D 90/04
[52] U.S. Cl. .................................... 220/562; 220/423; 220/450; 220/452; 220/901; 62/53.2; 138/149; 138/DIG. 2; 428/34.5; 428/36.91; 428/432
[58] Field of Search .............. 220/1.5, 421, 423, 424, 220/450, 452, 466, 467, 562, 901; 62/51.1, 53.2, 239; 428/34.4, 34.5, 36.9, 36.91, 432, 433; 138/148, 149, DIG. 2

[56] References Cited

U.S. PATENT DOCUMENTS

| | | | |
|---|---|---|---|
| 3,151,364 | 10/1964 | Glaser et al. | 220/450 X |
| 3,265,236 | 8/1966 | Gibbon et al. | 220/450 X |
| 3,346,016 | 10/1967 | Blau et al. | 220/450 X |
| 4,044,911 | 8/1977 | Hargreaves | 220/450 |
| 4,104,783 | 8/1978 | Schultz et al. | 138/149 X |
| 4,168,014 | 9/1979 | Schultz et al. | 138/149 X |
| 4,310,585 | 1/1982 | Shannon | 138/149 X |
| 4,347,271 | 8/1982 | Shannon | 138/DIG. 2 X |
| 4,614,016 | 9/1986 | Laing et al. | 138/149 X |
| 5,104,700 | 4/1992 | Peterson | 428/34.5 |
| 5,246,759 | 9/1993 | Keller | 220/452 X |

Primary Examiner—Allan N. Shoap
Assistant Examiner—Stephen Cronin
Attorney, Agent, or Firm—Cornelius P. Quinn

[57] ABSTRACT

A vessel for use in the transportation of cryogenic liquids in over the road cryogenic tankers has a double wall with a highly efficient, relatively light weight fiber glass insulation in the cavity between the walls. The fiber glass insulation increases in density from the inner wall of the cavity to the outer wall of the cavity having the least density adjacent the cold inner wall of the vessel which contains the cryogenic liquid and the highest density adjacent the outer wall of the cavity which is exposed to ambient conditions. One or more layers of reflective septa can be incorporated into the fiber glass insulation to reduce radiant heat transfer.

10 Claims, 2 Drawing Sheets

CURVES SHOWING THE SHIFT IN OPTIMUM DENSITY WITH INCREASING
MEAN TEMPERATURE (FOR EVACUATED AA FIBROUS INSULATION)

OPTIMUM EVACUATED FIBROUS INSULATION DENSITY VS
MEAN TEMPERATURE (AA FIBER)

INSULATION FOR VESSELS CARRYING CRYOGENIC LIQUIDS

BACKGROUND OF THE INVENTION

The present invention relates to providing an improved insulation for insulating double walled vessels for carrying cryogenic liquids. The improved light weight fiber glass insulation is used to fill the cavity between the walls providing high thermal resistivity thereby making the vessels ideal for use on over the road cryogenic tankers where the weight savings and good thermal performance provided by the insulation translates into transportation cost savings.

Large quantities of cryogenic liquids are routinely transported in over the road cryogenic tankers. Many of these tankers are insulated with expanded perlite at a density of 96 to 160 kg per cubic meter and reduced pressures below 0.07 millibar (0.05 mm Hg). Low binder content, 5-7 micron, fiber glass insulations at densities of 32 kg per cubic meter and at reduced pressures below 0.07 mb are also used to insulate these tankers. When compared to the expanded perlite insulation, the fiber glass insulations have significantly lower densities and offer similar thermal performances.

A few cryogenic tankers, particularly those used to transport lower temperature liquids, such as helium, use multi-layer insulations. These multi-layer reflective insulations are relatively expensive and comprise layers of aluminum foil or metalized film in the cavity between the walls of the vessel which are separated from each other to reduce heat transfer.

Insulation used in the vessels of cryogenic tankers should have the following properties: minimal weight and size to minimize tanker tare weight and maximize vessel capacity; efficient insulating properties to minimize cryogenic liquid boil-off rates; noncombustibility in an oxygen environment for use in vessels transporting liquid oxygen and liquid hydrogen; no outgasing or manageable outgasing during pump down to the vessel operating pressures; non-settling, even when subjected to the constant vibrations of over the road travel, so that noninsulated areas do not develop; and easy installation and maintenance over the life of the tanker.

Early work on fiber glass insulation for cryogenic applications was published in the following article: Christiansen, R. M., M. Hollingsworth, Jr., and H. N. Marsh, Jr. "Low-Temperature Insulating Systems," *Advances in Cryogenic Engineering*, 5:171–8 (1959). This article reports that "AA" fiber glass (0.8 to 1.3 micron fiber diameter) at densities from 8 to 240 kg per cubic meter demonstrated low thermal conductivities at reduced pressures and 191 degree K mean temperatures (with a 223 degree K delta T). The data indicates that increasing the density of the fiber glass insulation significantly reduces thermal conductivity with the optimum density being in the 128 to 240 kg per cubic meter range. The article also reported that the addition of reflective septa in the fiber glass insulation further reduced the thermal conductivity providing the greatest benefit on low density insulations.

Cryogenic thermal conductivity testing on larger diameter (9.0 micron) fiber glass insulations was reported in the following article: Smith, D. R. and J. G. Hust, "Effective Thermal Conductivity of Glass-Fiber Board and Standard Reference Materials," *Thermal Conductivity* 17, Plenum Press, 483–496 (1982). Smith tested SRM 1450a fiber glass board at a density of 127 kg per cubic meter and fiber glass blanket at a density of 14.75 kg per cubic meter. The data shows a large decrease in the thermal conductivity as the mean temperature decreases for the fiber glass blanket but less of an effect on the fiber glass board. According to the data reported by Smith, a 9.0 micron diameter fiber glass board at reduced pressures and a density of 127 kg per cubic meter would be an excellent insulation for cryogenic applications. However, at this density the fiber glass board would not provide any weight reduction for over the road cryogenic tankers where weight is directly related to operating costs.

SUMMARY OF THE INVENTION

Applicants discovered that an excellent cryogenic tanker insulation is a fiber glass insulation having a mean fiber diameter of about 1.5 microns or less and an increasing density gradient from the insulation which is in contact with the inner wall of the cryogenic vessel to the insulation which is in contact with the outer wall of the cryogenic vessel that is exposed to ambient temperature conditions. The density gradient of the insulation runs from a density of about 14 kg per cubic meter at its inner cold side up to a density not exceeding 48 kg per cubic meter at its outer ambient side.

In the present invention at the cold inner side of the insulation, where radiant heat transfer is less, low density fiber glass insulation is used thereby saving weight without causing any significant increase in thermal conductivity. Higher density fiber glass insulation is used at the ambient outer side of the insulation where the temperature is significantly higher since the use of a higher density insulation at these higher temperatures has a much more significant effect on reducing radiant heat transfer and thermal conductivity. Thus, by providing an insulation with a progressive density gradient, an overall comparatively light weight insulation is provided with excellent thermal performance. Such an insulation is noncombustible, exhibits manageable outgasing during pump down to the vessel operating temperatures, does not settle from exposure to vibrations and is easy to install and maintain.

DESCRIPTION OF THE PREFERRED EMBODIMENTS

Figure 1:
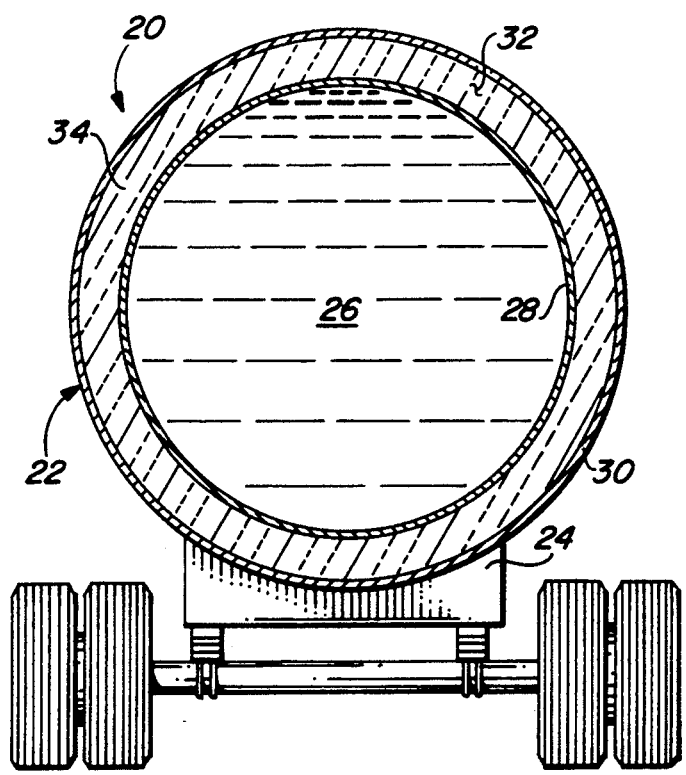
FIG. 1 is a schematic cross section of a typical cryogenic tanker.

As illustrated in FIG. 1, a cryogenic tanker 20 has a double wall cylindrical cryogenic vessel 22 for carrying a cryogenic liquid 26 mounted on a tanker frame 24. The cryogenic vessels 22 on such tankers are typically 6 to 12 meters in length with an outside diameter of 1.5 to 2.3 meters. The cryogenic liquids 26 transported over the road in these tankers are typically at temperatures between 4 and 100 degrees Kelvin.

The cylindrical vessel 22 has an inner wall 28 that contains the cryogenic liquid 26 and an outer wall 30 exposed to ambient temperature conditions. The annular cavity 32 formed between the inner wall 28 and the outer wall 30 is typically 10 to 18 centimeters across; evacuated to a reduced pressure of 0.001 to 0.07 millibar and filled with insulation.

Figure 2:
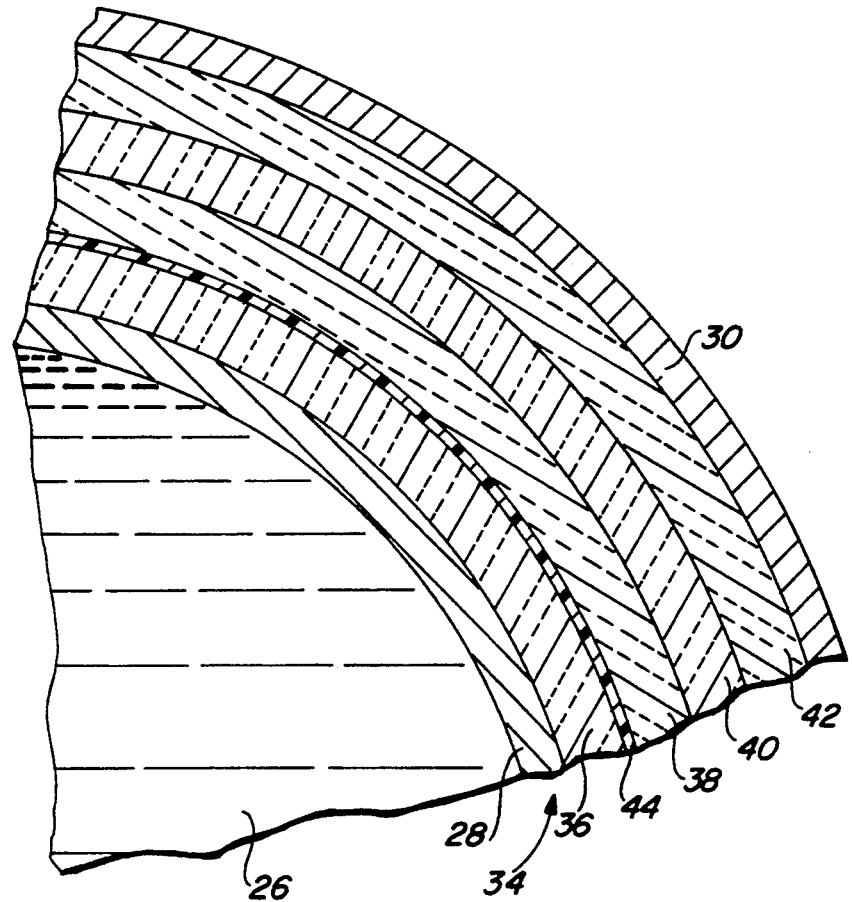
FIG. 2 is a detail of a portion of the vessel shown in FIG. 1 illustrating the insulation of the present invention.

In the present invention, the insulation 34 in the annular cavity 32, as shown in FIG. 2, comprises a plurality of layers 36-42 of fiber glass insulation with the density of the layers progressively increasing from the innermost layer 36 which is at least 14 kg per cubic meter to the outermost layer 42 which has a density of up to 48 kg per cubic meter and, preferably, at least 28 kg per cubic meter. While four layers of insulation are shown for illustrative purposes, the number of layers of insulation can vary.

Each of the fiber glass insulation layers is made of glass fibers having a mean diameter of about 1.5 microns or less and 10% by weight melamine binder at a 2.54 cm blanket thickness. Since the innermost layers, such as layer 36, are at relatively low temperatures where radiant heat transfer is much less, a low density fiber glass insulation can be used for these layers rather than a high density fiber glass insulation thus reducing weight without any significant increase in the thermal conductivity. Since the outermost layers, such as layer 42, are at a relatively high temperature where radiant heat transfer is much greater, high density layers of fiber glass insulation are used for these layers to keep the thermal conductivity low. Thus, the resulting density gradient insulation 34 is comparatively light in weight and provides an excellent thermal performance.

FIG. 2 also shows the use of a reflective septa 44 between insulation layers 36 and 38. The reflective septa 44 which can be aluminum foil, a metalized mylar film or other thin highly reflective sheet material is used to reduce radiant heat transfer through the insulation 34. While only one reflective septa 44 is shown in FIG. 2, additional layers of septa can be used if desired.

Figure 3:
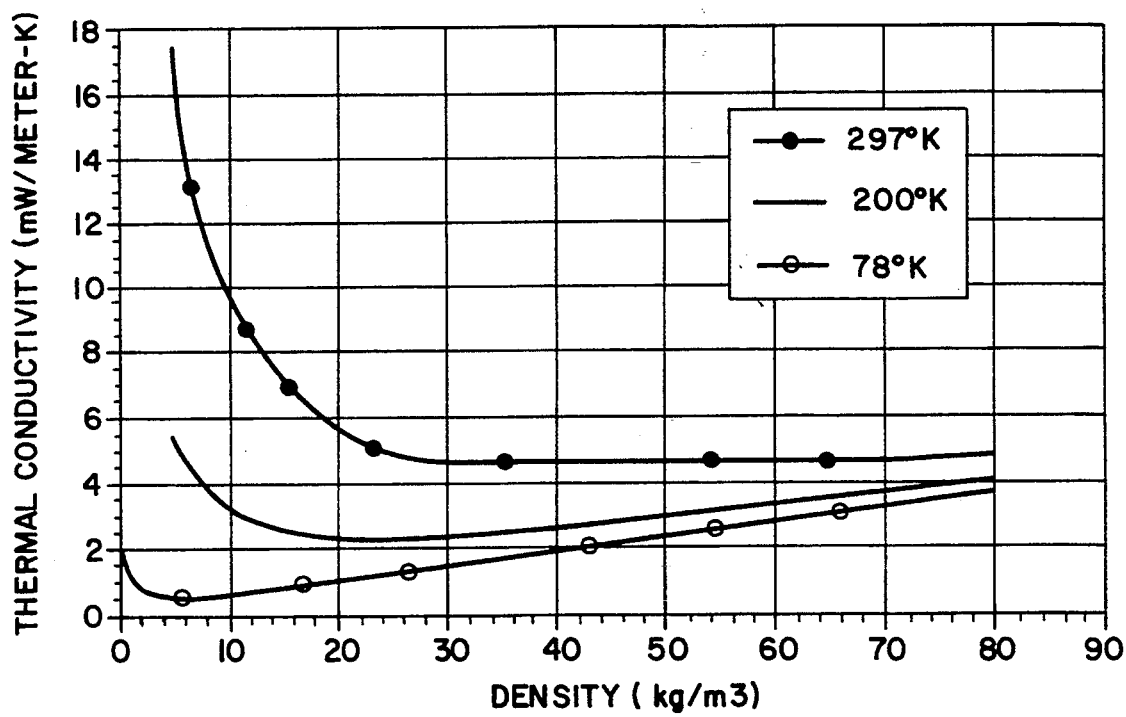
FIG. 3 is a graph showing the Shift in Optimum Density with Increasing Mean Temperature (for evacuated AA fiber glass insulation).
Figure 4:
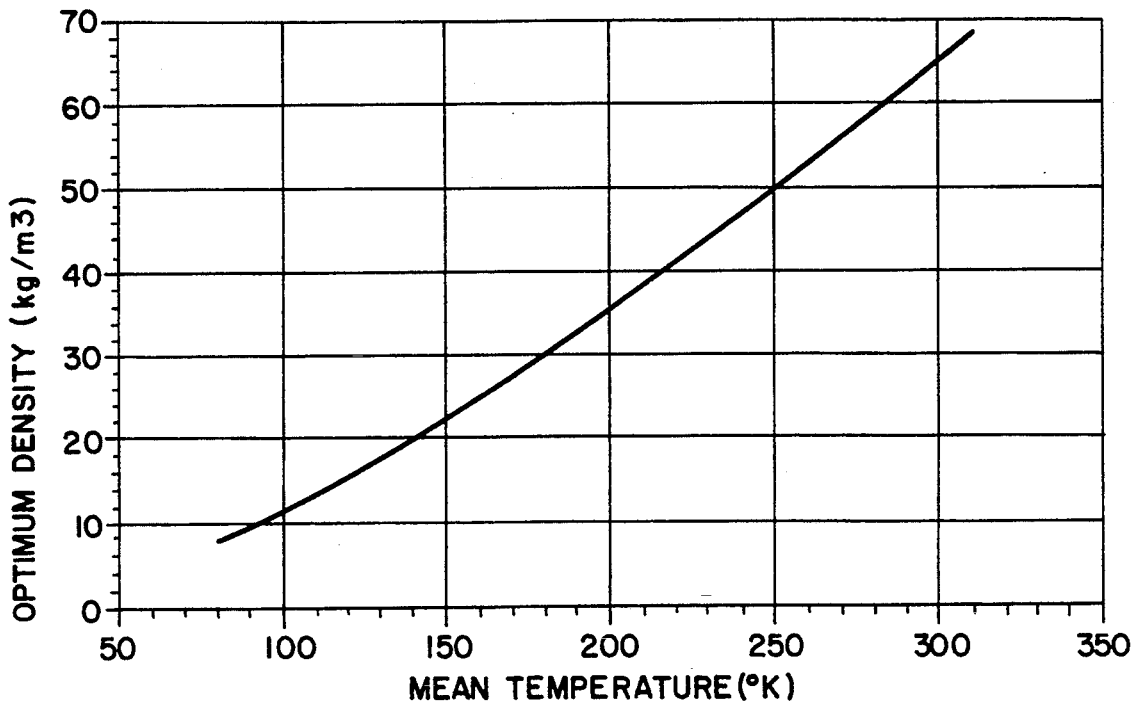
FIG. 4 is a graph of Optimum Evacuated Fibrous Insulation Density (AA glass fiber) vs Mean Temperature.

FIG. 3 is a plot of thermal conductivity vs density (evacuated AA fibrous insulation) for mean temperatures of 78, 200 and 297 degrees K. The graph illustrates that increasing the density of the insulation at high mean temperatures has a greater effect in reducing thermal conductivity than increasing the density of the insulation at lower mean temperatures. FIG. 4 is a plot of the predicted optimum density for fiber glass insulation (AA fiber) for mean temperatures of 78 to 297 degrees K. The predicted optimum density for the fiber glass insulation increases with increasing mean temperatures. These graphs further show that an increasing fiber glass insulation density gradient from the cold side of the insulation 34 to the ambient side of the insulation provides optimum thermal performance.

We claim:

1. In a cryogenic vessel for use in the transportation of cryogenic liquids having an inner wall for containing cryogenic liquids, an outer wall exposed to ambient conditions spaced from the inner wall to form a cavity therebetween, the improvement comprising, fiber glass insulation progressively increasing in density from said inner wall to said outer wall filling said cavity.

2. A cryogenic vessel as recited in claim 1 wherein said fiber glass insulation has a density of about 14 kg per cubic meter adjacent said inner wall and a density of about 48 kg per cubic meter adjacent said outer wall.

3. A cryogenic vessel as recited in claim 2 wherein glass fibers forming the glass fiber insulation have a mean diameter not greater than about 1.5 microns.

4. A cryogenic vessel as recited in claim 3 wherein said cavity normally has a reduced pressure between about 0.001 and 0.07 millibar.

5. A cryogenic vessel as recited claim 4 wherein said fiber glass insulation comprises a plurality of layers of fiber glass insulation.

6. A cryogenic vessel as recited in claim 5 wherein said fiber glass insulation includes at least one layer of reflective septa.

7. A cryogenic vessel as recited in claim 1 wherein said fiber glass insulation has a density of about 14 kg per cubic meter adjacent said inner wall and a density of at least about 28 kg per cubic meter adjacent said outer wall.

8. A cryogenic vessel as recited in claim 7 wherein glass fibers forming the glass fiber insulation have a mean diameter not greater than about 1.5 microns.

9. A cryogenic vessel as recited in claim 8 wherein said cavity normally has a reduced pressure between about 0.001 and 0.07 millibar.

10. A cryogenic vessel as recited in claim 9 wherein said fiber glass insulation comprises a plurality of layers of fiber glass insulation.

* * * * *